(12) United States Patent
Roundtree

(10) Patent No.: US 8,219,811 B2
(45) Date of Patent: Jul. 10, 2012

(54) SECURE SOFTWARE EXECUTION SUCH AS FOR USE WITH A CELL PHONE OR MOBILE DEVICE

(75) Inventor: Brian Roundtree, Kirkland, WA (US)

(73) Assignee: Nuance Communications, Inc., Burlington, MA (US)

( * ) Notice: Subject to any disclaimer, the term of this patent is extended or adjusted under 35 U.S.C. 154(b) by 618 days.

(21) Appl. No.: 11/575,058

(22) PCT Filed: Sep. 21, 2005

(86) PCT No.: PCT/US2005/033973
§ 371 (c)(1),
(2), (4) Date: Dec. 28, 2007

(87) PCT Pub. No.: WO2006/034399
PCT Pub. Date: Mar. 30, 2006

(65) Prior Publication Data
US 2008/0189550 A1 Aug. 7, 2008

Related U.S. Application Data

(60) Provisional application No. 60/611,607, filed on Sep. 21, 2004, provisional application No. 60/652,144, filed on Feb. 11, 2005.

(51) Int. Cl.
*H04L 29/06* (2006.01)
(52) U.S. Cl. .............................. 713/169; 713/184; 726/5
(58) Field of Classification Search .................... 713/169
See application file for complete search history.

(56) References Cited

U.S. PATENT DOCUMENTS

| 5,404,580 | A | 4/1995 | Simpson et al. |
| 5,475,735 | A | 12/1995 | Williams et al. |
| 5,675,628 | A | 10/1997 | Hokkanen |
| 5,790,798 | A | 8/1998 | Beckett, II et al. |
| 5,845,211 | A | 12/1998 | Roach, Jr. |
| 6,031,467 | A | 2/2000 | Hymel et al. |
| 6,199,045 | B1 | 3/2001 | Giniger et al. |
| 6,219,047 | B1 | 4/2001 | Bell |
| 6,246,756 | B1 | 6/2001 | Borland |
| 6,301,480 | B1 | 10/2001 | Kennedy, III et al. |

(Continued)

FOREIGN PATENT DOCUMENTS

CA 2454334 A1 2/2003

(Continued)

OTHER PUBLICATIONS

Muthukumaran et al., "Measuring Integrity on Mobile Phone Systems", Jun. 2008, pp. 155-164.*

(Continued)

*Primary Examiner* — Taghi Arani
*Assistant Examiner* — Thaddeus Plecha
(74) *Attorney, Agent, or Firm* — Perkins Coie LLP

(57) ABSTRACT

A method and system for securely executing software or securely loading data generates a secret value at a destination device based on a value transmitted to the destination device, which is algorithmically combined with a secure value stored at the destination device. The destination device, such as a cell phone, remotely accesses an entity or otherwise receives the software or data, where the software or data is encrypted or digitally signed based on the secret value. The cell phone then selectively employs the software or data.

9 Claims, 5 Drawing Sheets

U.S. PATENT DOCUMENTS

| | | | |
|---|---|---|---|
| 6,368,205 | B1 | 4/2002 | Frank et al. |
| 6,370,399 | B1 | 4/2002 | Phillips |
| 6,389,278 | B1 | 5/2002 | Singh |
| 6,424,945 | B1 | 7/2002 | Sorsa et al. |
| 6,430,407 | B1 | 8/2002 | Turtiainen et al. |
| 6,496,979 | B1 | 12/2002 | Chen et al. |
| 6,591,229 | B1 | 7/2003 | Pattinson et al. |
| 6,615,038 | B1 | 9/2003 | Moles et al. |
| 6,618,478 | B1 | 9/2003 | Stuckman et al. |
| 6,646,570 | B1 | 11/2003 | Yamada et al. |
| 6,654,594 | B1 | 11/2003 | Hughes et al. |
| 6,668,169 | B2 | 12/2003 | Burgan et al. |
| 6,766,017 | B1 | 7/2004 | Yang et al. |
| 6,792,280 | B1 | 9/2004 | Hori et al. |
| 6,909,910 | B2 | 6/2005 | Pappalardo et al. |
| 6,922,721 | B1 | 7/2005 | Minborg et al. |
| 6,940,844 | B2 | 9/2005 | Purkayastha et al. |
| 6,944,447 | B2 | 9/2005 | Portman et al. |
| 6,961,587 | B1 | 11/2005 | Vilppula et al. |
| 6,970,698 | B2 | 11/2005 | Majmundar et al. |
| 7,177,665 | B2 | 2/2007 | Ishigaki |
| 7,194,257 | B2 | 3/2007 | House et al. |
| 7,218,912 | B2 | 5/2007 | Erskine et al. |
| 7,353,016 | B2 | 4/2008 | Roundtree et al. |
| 7,359,706 | B2 | 4/2008 | Zhao |
| 7,539,484 | B2 | 5/2009 | Roundtree |
| 2001/0014615 | A1 | 8/2001 | Dahm et al. |
| 2002/0034940 | A1 | 3/2002 | Takae et al. |
| 2002/0065109 | A1 | 5/2002 | Mansikkaniemi et al. |
| 2002/0112172 | A1 | 8/2002 | Simmons |
| 2002/0115476 | A1 | 8/2002 | Padawer |
| 2002/0128036 | A1 | 9/2002 | Yach et al. |
| 2002/0152229 | A1 | 10/2002 | Peng |
| 2003/0039948 | A1 | 2/2003 | Donahue |
| 2003/0053615 | A1 | 3/2003 | Anderson et al. |
| 2003/0112931 | A1 | 6/2003 | Brown et al. |
| 2003/0188174 | A1* | 10/2003 | Zisowski ............ 713/189 |
| 2003/0191945 | A1* | 10/2003 | Keech ............... 713/182 |
| 2003/0204725 | A1 | 10/2003 | Itoi et al. |
| 2004/0005051 | A1 | 1/2004 | Wheeler et al. |
| 2004/0078798 | A1 | 4/2004 | Kelly et al. |
| 2004/0132431 | A1 | 7/2004 | Vandermeijden et al. |
| 2004/0142720 | A1 | 7/2004 | Smethers |
| 2004/0152455 | A1* | 8/2004 | Herle ............... 455/418 |
| 2004/0171375 | A1 | 9/2004 | Chow-Toun |
| 2004/0172561 | A1 | 9/2004 | Iga |
| 2004/0193444 | A1 | 9/2004 | Hufford et al. |
| 2004/0249846 | A1 | 12/2004 | Randall et al. |
| 2005/0004875 | A1* | 1/2005 | Kontio et al. ........ 705/52 |
| 2005/0071657 | A1 | 3/2005 | Ryan |
| 2005/0233733 | A1 | 10/2005 | Roundtree et al. |
| 2006/0003758 | A1 | 1/2006 | Bishop et al. |
| 2006/0053308 | A1 | 3/2006 | Zimmerman |
| 2006/0121882 | A1 | 6/2006 | Zhao et al. |
| 2006/0158436 | A1 | 7/2006 | LaPointe |
| 2006/0245391 | A1 | 11/2006 | Vaidya et al. |
| 2007/0005967 | A1 | 1/2007 | Mister et al. |
| 2007/0173237 | A1 | 7/2007 | Roundtree |
| 2007/0207795 | A1 | 9/2007 | Roundtree |
| 2007/0293199 | A1 | 12/2007 | Roundtree et al. |
| 2007/0293200 | A1 | 12/2007 | Roundtree et al. |
| 2008/0194296 | A1 | 8/2008 | Roundtree |
| 2008/0256447 | A1 | 10/2008 | Roundtree |
| 2008/0280588 | A1 | 11/2008 | Roundtree et al. |
| 2009/0124271 | A1 | 5/2009 | Roundtree et al. |

FOREIGN PATENT DOCUMENTS

| | | |
|---|---|---|
| CN | 2478292 | 2/2002 |
| CN | 1361995 A | 7/2002 |
| CN | 1611087 | 4/2005 |
| EP | 1387241 | 2/2004 |
| GB | 2340344 | 2/2000 |
| GB | 2365711 | 2/2002 |
| JP | 10084404 | 3/1989 |
| JP | 11259199 | 9/1999 |
| JP | 2003067334 | 3/2003 |
| JP | 2004021580 | 1/2004 |
| WO | WO-9707641 | 2/1997 |
| WO | WO-0070888 | 11/2000 |
| WO | WO-0186472 | 11/2001 |
| WO | WO-2005081852 A2 | 9/2005 |
| WO | WO-2005083996 A1 | 9/2005 |
| WO | WO-2006034399 A2 | 3/2006 |
| WO | WO-2007002499 A2 | 1/2007 |
| WO | WO-2008042989 A2 | 4/2008 |
| WO | WO-2008101135 A1 | 8/2008 |

OTHER PUBLICATIONS

European Search Report for European Application No. 05713762.2, dated Jun. 27, 2008, Applicant SNAPin Software Inc.
International Search Report for International Application No. PCT/US06/40398, dated Jul. 15, 2008, Applicant SNAPin Software Inc.
Japanese Office Action dated Jun. 16, 2008 under Japanese Patent Application No. 2006-554217, 10 pages.
U.S. Appl. No. 11/917,323, filed Dec. 12, 2007, Roundtree et al.
U.S. Appl. No. 12/370,524, filed Feb. 12, 2009, Roundtree.
U.S. Appl. No. 12/444,332, filed Apr. 3, 2009, Roundtree.
U.S. Appl. No. 12/446,221, filed Apr. 17, 2009, Roundtree.
U.S. Appl. No. 12/521,989, filed Jul. 1, 2009, Roundtree.
U.S. Appl. No. 12/522,901, filed Jul. 10, 2009, Roundtree.
"OMA Device Management Example Server for Advanced Device Management," Nokia, Feb. 1, 2006.
3rd Generation Partnership Project. "Specification of the SIM Application Toolkit for the Subscriber Identity Module—MobileEquipment (SIM-ME) Interface (Release 1999)," 3GPP Organizational Partners, 2004, 143 pages.
Center for Customer Driven Quality at Purdue University, "It's the Solution, Stupid," 2004, 2 pages.
Gartner, "Contact Center Investment Strategy and Leading Edge Technologies," http://www.gartner.com/4_decision_tools/measurement/measure_it_articles/2002_12/contact_center_investment_strategy.jsp, accessed on Jul. 8, 2008, 4 pages.
International Search Report for International Application No. PCT/US05/5517, dated Jul. 6, 2005, Applicant SNAPin Software Inc.
International Search Report for International Application No. PCT/US05/05135, dated Oct. 26, 2006, Applicant SNAPin Software Inc.
International Search Report of International Application No. PCT/US08/50447, dated Apr. 10, 2008, Applicant SNAPin Software Inc.
International Search Report of International Application No. PCT/US06/24637, dated Aug. 1, 2007, Applicant SNAPin Software Inc.
International Search Report of International Application No. PCT/US07/61806, dated Feb. 13, 2008, Application SNAPin Software Inc.
International Search Report of International Application No. PCT/US05/33973, dated Apr. 19, 2006, Applicant SNAPin Software Inc.
U.S. NonFinal Office Action dated Aug. 16, 2006 under U.S. Appl. No. 11/063,663, 15 pages.
U.S. NonFinal Office Action dated Jan. 26, 2006 under U.S. Appl. No. 11/063,663, 17 pages.
U.S. NonFinal Office Action dated Jul. 23, 2008 under U.S. Appl. No. 11/672,499, 11 pages.
U.S. NonFinal Office Action dated Sep. 17, 2007 under U.S. Appl. No. 11/063,663, 8 pages.
SNAPin Software Inc., "SNAPin White Paper: The Service Experience Opportunity," <http://www.snapin.com>, 2005, 16 pages.

* cited by examiner

SECURE SOFTWARE EXECUTION SUCH AS FOR USE WITH A CELL PHONE OR MOBILE DEVICE

CROSS-REFERENCE TO RELATED APPLICATION(S)

This application claims the benefit of U.S. Provisional Patent Application 60/611,607, filed Sep. 21, 2004, entitled SECURE MOBILE DEVICE SOFTWARE EXECUTION, HELP-SUPPORT-CARE INITIATION FOR MOBILE DEVICES, AND SMART NETWORK CONFIGURATION SELECTION FOR MOBILE DEVICES, and U.S. Provisional Patent Application No. 60/652,144, filed Feb. 11, 2005, entitled CALL INTERCEPT METHODS, SUCH AS FOR CUSTOMER SELF-SUPPORT ON A MOBILE DEVICE.

BACKGROUND

Current methods for downloading software for remote execution on mobile devices do not provide the required security to prevent malicious attacks on the large networks managed by network operators. Because mobile devices often need to execute software functionality without an active connection to a secured key resource, a method that provides a secure way to distribute and execute software on devices is needed.

Current methods for downloading software from a network to a mobile device require the network to monitor the mobile device and to determine what software to transmit to the mobile device. Subscribers may be required to contact the network from the mobile device to retrieve updated mobile device configurations or settings based on input from the network itself. This may lead to increased network traffic, an increase in the amount of bandwidth used by the network, decreased connection speed to the network, and increased time it takes for a subscriber to download software from the network.

In addition, problems also exist with validating software downloaded from the network to the mobile device. Validating software through the network may create security issues. In order to validate software, the network may need to verify confidential data associated with the mobile device appropriately relates to data stored in a database on the network. This presents the danger of compromising confidential data associated with the mobile device.

Figure 1:
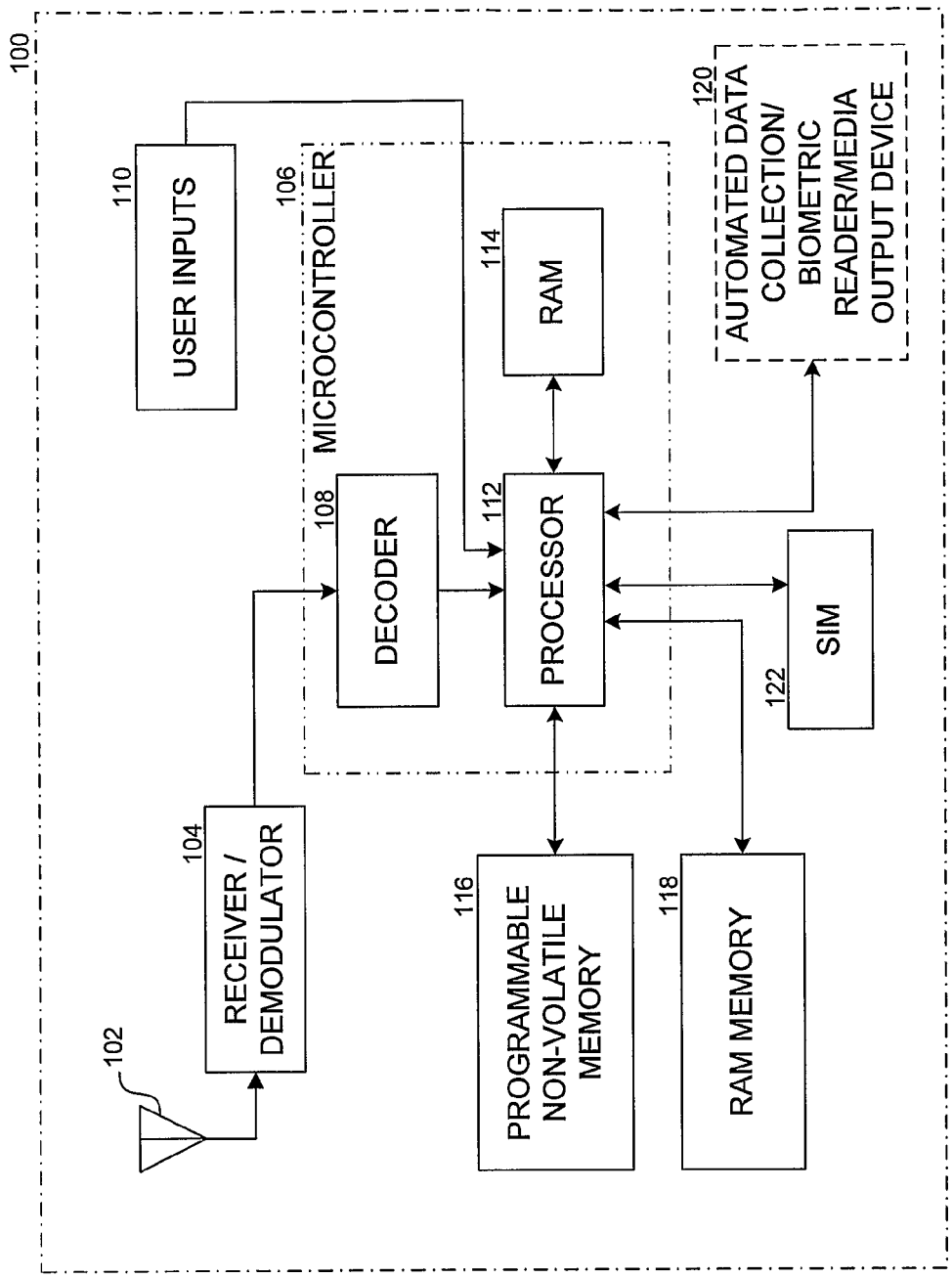
FIG. 1 is a schematic diagram illustrating a mobile device on which call intercept methods, customer self-support, and other functions can be accessed via various user interfaces.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced.

DETAILED DESCRIPTION

As noted above, mobile device providers such as wireless service providers, need the ability to interact with their subscribers and their subscribers' mobile devices to provide both general and technical support services. The wireless service providers or network operators need to execute software to collect and set specific device configurations, ascertain device status, and so forth. They need to remotely execute software with a high degree of security. A concern, however, is that unauthorized software could take advantage of vulnerabilities in this system.

Certain embodiments of the invention described below provide examples of ways to overcome this problem by using, for example, a Subscriber Identification Module ("SIM") or other device on the mobile device, to securely store a unique code or secret key and provide one-way algorithms such as hashes based on it and/or other data. The hash may also be based on other hardware specific information not normally available via network access, such as an International Mobile Equipment Identifier (IMEI), International Mobile Subscriber Identifier (IMSI), or other known unique values or data stored on mobile devices. A combination of such data stored locally on the mobile device may be combined or algorithmically modified before or after being subjected to hashing or similar processes to generate a resulting value. The value may then be used to encrypt or authenticate downloaded software, scripts or data provided to the mobile device. By so doing, every piece of software, scripts or data may be uniquely tied to a specific hardware device (mobile device or SIM), or a specific combination of hardware devices (e.g., hardware with SIM).

Thus, system as described below provide the ability to remotely execute software on mobile devices without the need for network connectivity to a key repository or for exchange of secret data over the network where it could be intercepted or compromised. The systems use device resident physical security based on a SIM or other hardware specific features, and associated secure numbers, such as the IMEI, or other numbers, such a MAC address, Universal Subscriber Identity Module (USIM), secure serial number, etc. Software and data can be authenticated or decoded only with information physically present on the target mobile device, which helps prevent the spread of malicious or unauthorized software.

The system makes it improbable or impracticable to sign scripts to authorize software or data for general (mass) distribution or make it only impractical to hack the mobile device if it can be under complete control of a hacker having malicious intent. The system is able to authenticate and secure the installation and execution of software driven activities that have been issued from a specific, authorized source.

The system can ensure that a unique key is created that requires an authorizing device (e.g., the controlling network server), computing device specific information (e.g. the mobile device's IMEI), and a subscriber (user) specific bit of information (e.g. some information that is related to the subscribers account, like the IMSI, account number, mobile device number, or user name). By using a key created of these three elements in the system, the system will only function when all three are present. In this way, the controlling server can always be assured that a competitive mobile operator cannot hijack their valuable customers/subscribers. Also, hackers can not modify scripts on one device and transport them readily to other devices for execution—cracking one key unique to one mobile device/subscriber does note give the hacker any advantage at cracking the next. Further, multiple subscribers can use a single device and each have functionality and personal information separate and secure.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Suitable System

Figure 2:
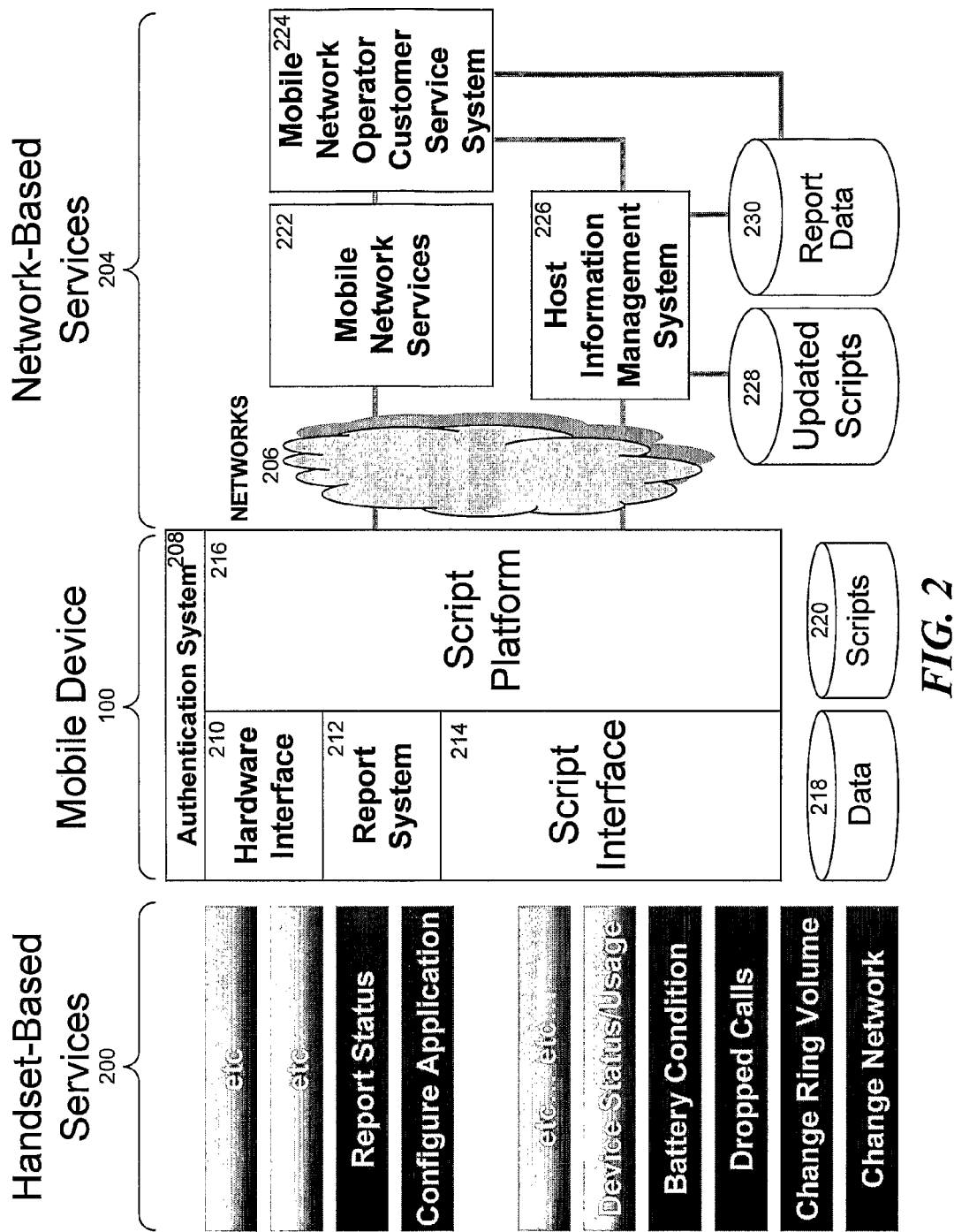
FIG. 2 is a schematic diagram illustrating a system architecture for implementing call intercept methods and customer self-support.

In general, FIGS. 1-2 and the discussion herein provide a brief, general description of a suitable telecommunications or computing environment in which aspects of the invention can be implemented. Although not required, aspects of the invention are described in the general context of machine-executable instructions, such as routines executed by a general-purpose computing or telecommunications device, e.g., cell phone, mobile device, server computer, or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "mobile device," "handset," and similar terms may be used interchangeably herein, and refer to any of the above devices and systems, as well as any data processor.

Aspects of the invention can be embodied in a special purpose computing device or data processor that is specifically programmed, configured, or constructed to perform one or more of the computer-executable instructions explained in detail herein. Aspects of the invention may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

FIG. 1 illustrates an example of a mobile device 100 on which security methods can be implemented in accordance with several embodiments of the invention. A receiver/demodulator 104 receives a transmitted signal via an antenna 102 and reconstructs the original transmitted signal. The transmitted signal is sent to a microcontroller 106, which consists of a decoder 108, a processor 112, and RAM (Random Access Memory) 114. The decoder 108 translates the signals into meaningful data and interfaces to other devices. Decoded data, along with subscriber inputs 110, are sent to the processor 112. In addition, the mobile device may include optional components, such as an automated data collection 120 unit linked to the processor 112, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, etc.) 120. The mobile device may also include a subscriber identity module (SIM) 122 or other secure data storage. The output of the processor 112 can be stored in a programmable non-volatile memory 116, in SIM 122, or in the RAM memory 118.

FIG. 2 illustrates an example of system architecture for implementing security methods described below. The system architecture includes three components: handset-based services 200, the mobile device 100, and network-based services 204 executed by one or more network servers. The handset-based services 200 may include executable software, software configurations, hardware configurations and controls, scripts, data, and handset operating system interfaces. As disclosed herein, executable software may include, without limitation, any software program or scripts stored on the mobile device or associated memory device, both permanently and temporarily connected via hardware or wireless connectivity.

The mobile device 100 includes an authentication system 208 (e.g., via the SIM 122, and described below), a hardware interface 210, a report system 212, a script interface 214, a script platform 216, data 218, and scripts 220. The network-based services 204 may include a network or networks 206, mobile network services 222, a mobile network operator customer service system 224, a host information management system 226, updated scripts 228, and report data 230. The components within the mobile device 100 allow the device to integrate both handset-based services 200 and network-based services 204. The authentication system 208 can implement SIM card-based or standalone authentication to meet network requirements for desired levels of security, as described below.

The hardware interface 210 may retrieve hardware interface elements required for interfacing with network or phone-based customer support services. Examples of hardware interface elements include changing volume, changing frequency, retrieving SIM (Subscriber Identity Module) ID or other data stored on the SIM 122, connection status from the SIM or radio hardware, and others. The report system 212 may collect and forward the data reported by the mobile device to the network 206. The report system 212 can also encrypt the handset identification information and other data noted below to provide increased security. The information can be encoded so that only the host information management system 226 can decipher the handset identification information and other values described below.

The script interface 214 serves as a standard application programming interface for customer support services. More specifically, the script interface 214 provides an interface between scripts 220 and the various hardware-specific and executable, program-specific functions. The script interface 214 allows a single customer service script to be deployed across multiple operating systems and hardware configurations, but where such scripts are associated with or uniquely tied to specific handsets, as noted below. In addition, the script interface 214 includes a standard API (Application Programming Interface) for both the hardware/OS side and the script interface.

The script platform 216 can mix and match calls through the script interface to acquire information, to change or correct settings on the phone, and to perform additional functions. The script platform 216 authenticates, runs, and updates all scripts 220, manages reporting updates and changes, communicates with the host information management system 226, communicates with the GUI (Graphical User Interface), and performs functions such as managing customer surveys and queries, etc. The host information management system 226 can push a notification to the script platform 216 via USSD (Unstructured Supplementary Services Data), SMS (Short Message Service), IP (Internet Protocol), or any other network connectivity that the mobile device supports. The script platform 216 can run the scripts 220 after authentication, and the scripts 220 can be authenticated to the network 206 and/or to the mobile device.

The components within the network-based services 204 allow the mobile device 100 to communicate with and to retrieve data from the network 206. The network-based services 204 may include wired and wireless systems. The mobile network services 222 may consist of one or more systems including billing, CRM (Customer Relationship Management), provisioning, download of media (e.g. audio, images, video, games, utilities, etc.), and others. Furthermore, mobile network services 222 are able to return data calls made by mobile devices via standard network protocols (e.g., IP, DTMF (Dual-Tone Multi-Frequency), SMS, USSD, etc.).

The mobile network operator customer service system 224 may also consist of one or more systems relating to customer service, including billing, CRM, provisioning, downloading of media (e.g. audio, video, games, utilities, etc.), and others. The host information management system 226 controls interactions between the mobile device and the host customer support system. The host information management system 226 can transmit updates to the mobile device. The mobile device typically employs a unique handset ID or serial number, a mobile phone number, and other data noted herein. The report data 230 provides storage for report information gathered from the mobile device. The updated scripts 228 consist of scripts that the host customer support system provides to the mobile device. The updated scripts 228 can be managed and versioned as desired by the host information management system 226, can be targeted at specific subscribers/handsets or groups of subscribers, can include requests for reports and customer interview surveys, and so forth. Further details regarding the system at FIG. 2 may be found in PCT Application No. US05/05135, filed Feb. 18, 2005, entitled "Call Intercept Methods, such as for Customer Self-Support on a Mobile Device," U.S. patent application Ser. No. 11/063,663, filed Feb. 22, 2005, and PCT Application No. US05/05517, filed Feb. 18, 2005, entitled "User Interface Methods, such as for Customer Self-Support on a Mobile Device".

Depicted Security Processes

Figure 3:
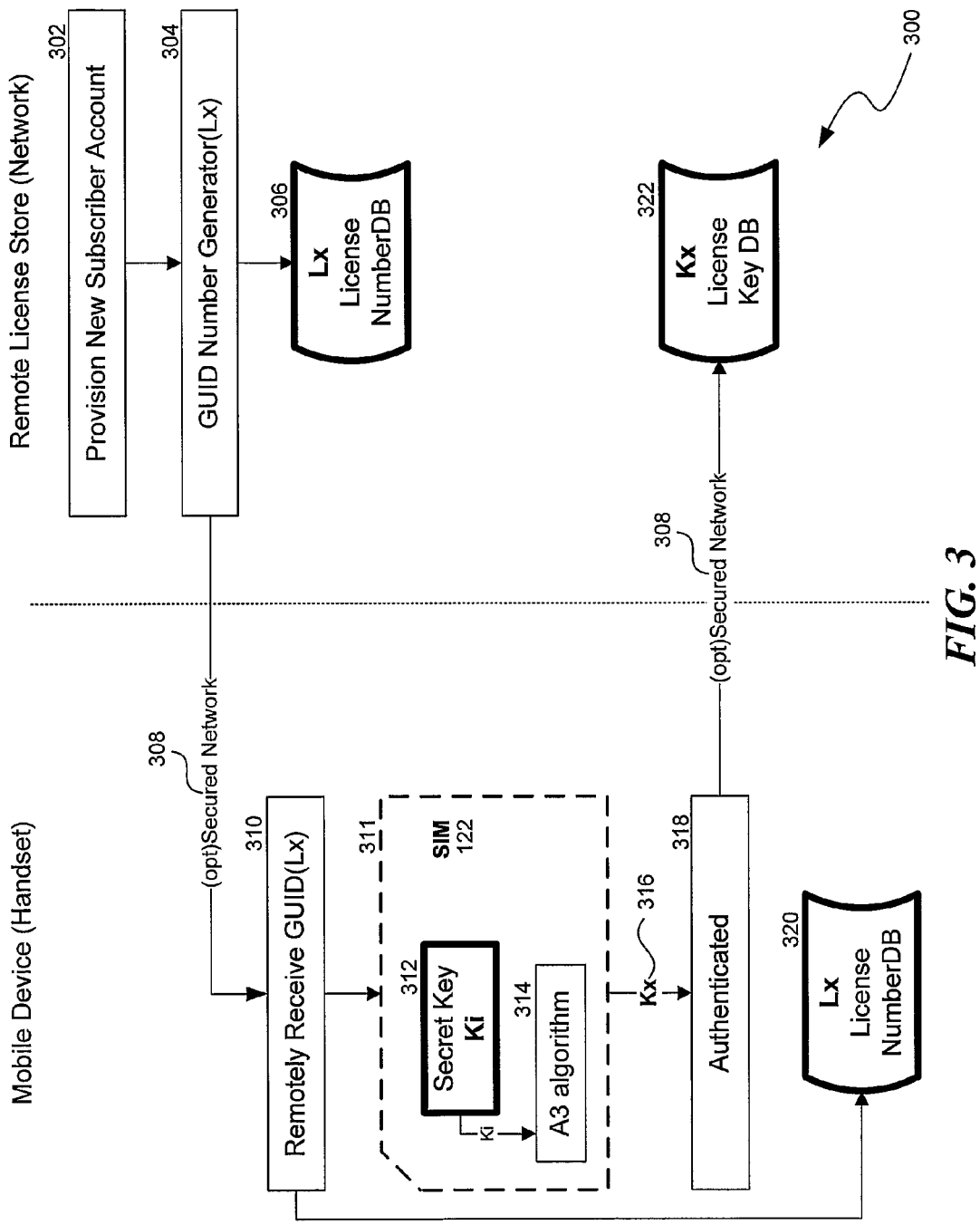
FIG. 3 is a flow diagram illustrating an example of a process for creating a new secret key or other confidential data element between a mobile device and a network element such as a server.

Referring to FIG. 3, an example of a process or method for registering a handset and creating a new key is shown as a process 300. The mobile device 100 may begin with a minimal software installation sufficient to simply permit automatic or over-the-air registration. Over-the-air registration is known in the art. During or following this registration, software stored in the handset sends a short data or text message (e.g., SMS message) to a predefined number or address representing a mobile number or address, to thereby route the message to a designated server, either a server of a wireless service provider, or that of a third party providing service described below. The short message and its heading contains a request to create a new service account, and contains subscriber and handset specific information, such as the IMEI and/or other unique number associated with the mobile device 100. The short message may also include a subscriber ID. In response to receiving the request, the server employs logic to process data contained in the short message (including data in the short message header) in accordance with provisioning a new subscriber account. If the short message is sent to a third party server, then a Short Messaging Service Center (SMSC) and/or the third party server may be specifically programmed to reroute the message to an internal server associated with the wireless service provider or mobile network operator, which in turn completes the registration/provisioning process. Alternatively, if the third party server handles the request, it accesses a database or otherwise determines how a particular wireless service provider wishes to have the new mobile device registered, and responds accordingly to provision a new subscriber account. Of course, other methods of establishing a new subscriber account may be performed, which is shown generally in FIG. 3 under block 302.

Under block 304, the network generates a globally unique identifier (GUID) using an appropriate number generator, such as a pseudo-random number generator. This is then stored as a unique license number Lx 306 in a database associated with the network. The number Lx is stored as a record or other data structure associated with the mobile device 100 (e.g. associated with the mobile phone number for the mobile device). The network forwards this number Lx to the mobile device, which may optionally be sent over a secure network 308. The number Lx may be included with other information, or in lieu of other information, such as an account type, special Universal Resource Locator (URL), APN or electronic address for home server access, etc.

The mobile device remotely receives the GUID Lx (block 310) and creates a new "public key" for proving that the mobile device or SIM 122, has an unknown secret key Ki. Under block 311, the mobile device employs some secret key Ki 312 with the remotely received GUID Lx using an appropriate algorithm 314, such as an appropriate hashing algorithm (shown as A3 algorithm in FIG. 3). The result of the algorithm or hash is a practicably irreversible value Kx 316. In other words, a subroutine or agent on the mobile device requests the SIM to hash Lx with a locally stored value.

The generated value Kx can be created by the mobile device using a locally stored value employed to algorithmically render Lx into the value Kx where any third party could not discern the locally stored data on the mobile device based simply on the value Kx. As noted herein, the mobile device may use any locally stored and secure data, such as the USIM, IMEI, IMSI, or other values or combinations of these values. Thus, Kx is based on Lx and one or more values associated with this subscriber or the mobile device, where it is infeasible for a third party to discern these values based only on Kx.

Under block 318, the mobile device returns the value Kx to the server, which again may be optionally transmitted over the secure network 308. The value Kx is not stored in permanent memory within the mobile device, and is flushed from temporary memory after being generated and used. Upon receiving the value Kx, the network stores this value in a license key database (block 322), while the mobile device stores the Lx number in a number database (block 320).

To improve security, the mobile device can optionally obfuscate the Kx value by using a two-way encryption function before, such as and encryption functioned based on Lx, returning the Kx value to the server, such as via an SMS message. The Kx encrypting key can be anything including the IMEI or other information on the handset, or provided by the subscriber, such as a pin or password. This pin or password then can be communicated to the network server or wireless service provider via an alternate channel, such as via a telephone call or website.

Further, while one embodiment of the invention combines the GUID Lx from the server with the IMEI, which is then hashed by the SIM to create Kx, other combinations are possible. For example, another embodiment of the invention could combine the GUID with the IMEI and the IMSI, which would then be hashed using a basic hashing function. As another alternative, the GUID may be combined with the IMEI and the phone number for the mobile device, which would then be hashed, or simply Lx could be hashed by the SIM, with or without a subscriber ID value. In general, any combination of subscriber specific, device specific, and/or carrier specific information may be used to create an encryption/authentication key set that uniquely limits the authentication from working on any device other that the specific subscriber-device-carrier (or any combination) from working. (In general, the terms "operator", "carrier" and "service provider" are used interchangeably herein.)

In general, while use of the SIM 122 is described above, any secure memory of the mobile device may be employed. Use of the SIM's logic is helpful because of its inherent security features, although many other devices may be employed, such as smart cards, tamper-resistant or tamperproof memory, and so forth. While a secret key Ki is shown in FIG. 3, a combination of other device and subscriber specific information may be employed or included with the hash to generate Kx.

Figure 4:
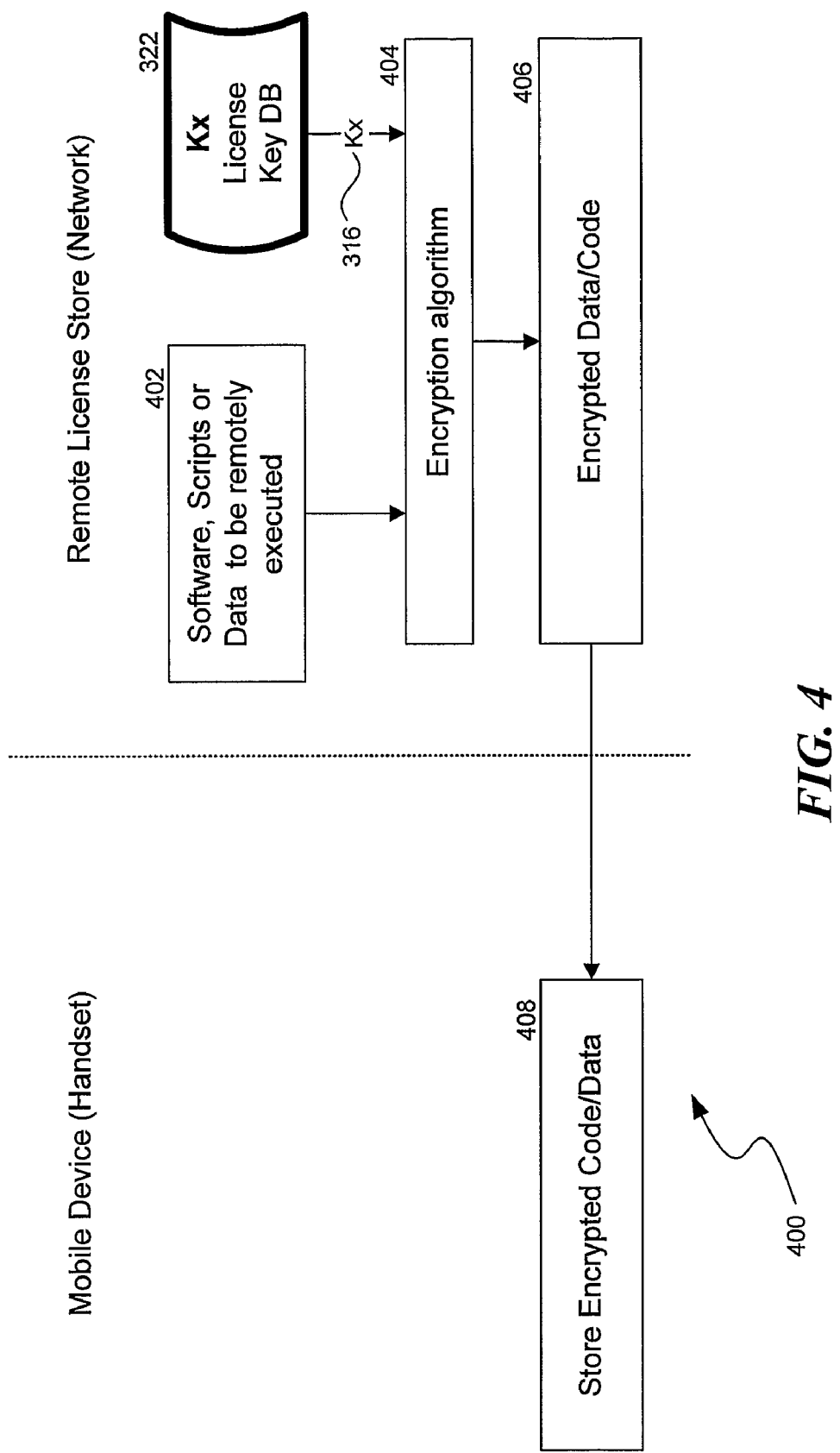
FIG. 4 is a flow diagram illustrating an example of a process for encoding or securing software or other information for download to the mobile device using the secret key generated under FIG. 3.

Referring to FIG. 4, a process or method for downloading secure software, scripts or data to the mobile device is shown as a process 400. Beginning in block 402, the network server selects one or more files to be downloaded to the mobile device. The files may include anything, such as software code, scripts, documents, data, audio, images, video, games, utilities, etc. Such files may be downloaded at the request of the mobile device or subscriber, or at the request of the network server or the person associated with the server, such as a customer support representative associated with a wireless service provider. Under block 404, the files are encrypted using the value Kx previously stored to generate encrypted files (block 406). The files may be converted to native binary form and then effectively authenticated with a shared key hashing algorithm. The encrypted files are transmitted or sent to the mobile device using standard protocols and procedures, but the mobile device will only execute files that have been authenticated (block 408). In general, all uses of encryption may be interchangeable with digital signing or authenticating. In other words, rather than encrypting the files, the files may instead be associated with a digital signature authorizing or authenticating the files. Thus, the mobile device only executes files that it can either decrypt, or where it validates or authenticates the digital signature associated with the file.

Note also that the network server may employ Kx, or create Kx or a related value based on data previously received from the mobile device (blocks 318, 322) and one or more pieces of locally stored data at the network server based on an algorithm known to both the mobile device and the network server. An electronic signature may be added to the header for each file sent to the specific mobile device. This will ensure that the files will only be able to be run or accessed by the specific mobile device.

Figure 5:
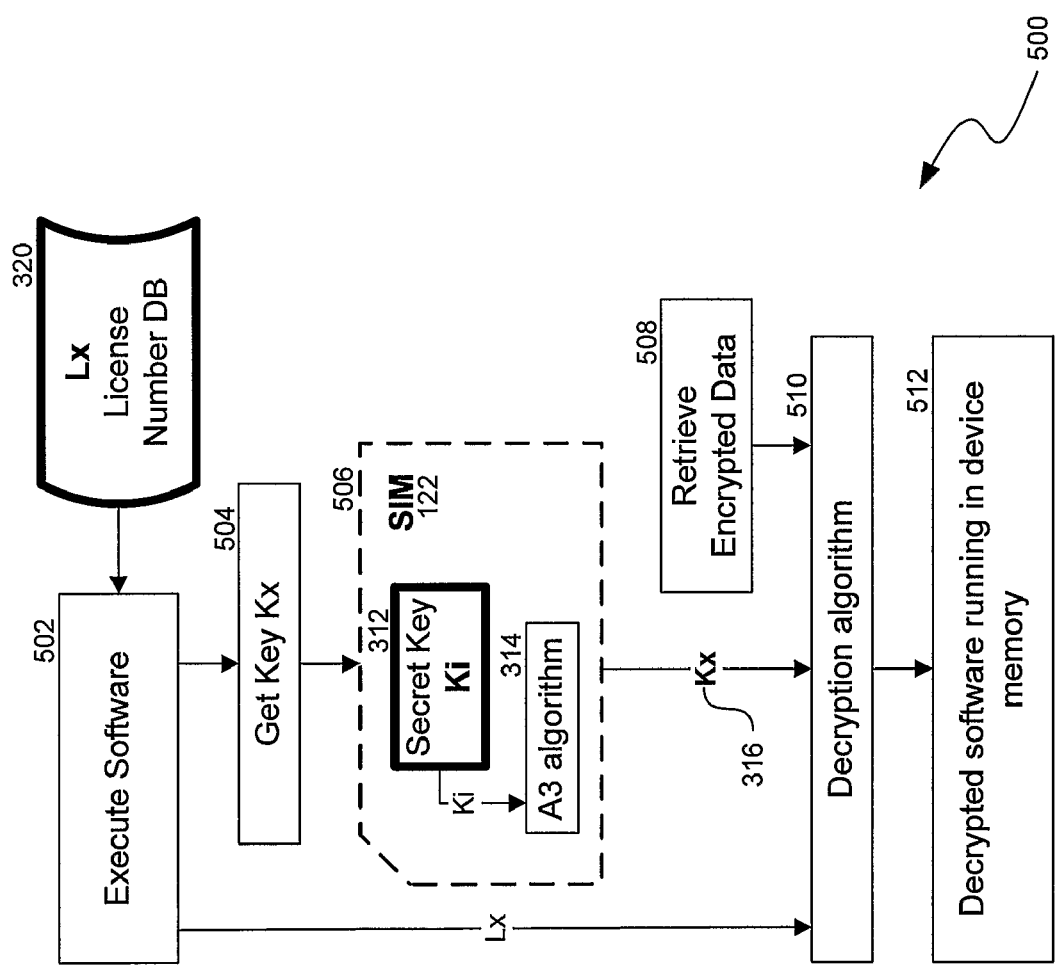
FIG. 5 is a flow diagram illustrating an example of a process for allowing the mobile device to securely use the downloaded software or other information provided under FIG. 4 without the need for an active network connection.

Referring to FIG. 5, a process or method for using secure files sent to and at least temporarily stored on the mobile device is shown as a routine 500. Beginning in block 502, the mobile device initiates and executes software process and retrieves Lx from the licensed number database 320. In block 504, the mobile device executes a get key Kx process and in block 506, using Ki, Lx, or other data, again generates or recalculates Kx through use of the hashing algorithm 214. Kx is generated the same way it was before under the key creation process described with respect to FIG. 3.

In block 508, the mobile device retrieves the encrypted/digitally signed data it received under block 408, and executes a decryption algorithm to decrypt the file. Under block 512, if the decryption is successful, the mobile device runs the decrypted software in memory on the device. In other words, if the files include a digital signature, then the mobile device checks the signature received with a file based on a signature generated using the recalculated Kx.

Note that the mobile device can execute the encrypted/digitally signed software or access encrypted/signed data without further network access. The mobile device will only execute software code, scripts, or data that can be decrypted/authenticated with the proper combination of data noted above. Before executing any code or scripts, digital signatures associated with the files may be authenticated with the specific combination of data defined during the registration process noted above under FIG. 3. This authentication or decryption process occurs each time code, scripts or data are loaded from, for example, long-term memory (memory 116) for execution by the mobile device, and thus, for example, executable software is authenticated at run-time.

Since the mobile device initiates connection to the network, potential hackers may not alter a command unless they know this and a secret key on the mobile device itself. Potential hackers may not push commands to the mobile device because they do not have the secret key for the SIM on the mobile device. The random number is hashed against a secret key, the output of the hash is stored in the system so that the secret key can be re-created when combined with the license number database 618. This creates greater security.

Further, multiple subscribers can use a single device and each have functionality and personal information separate and secure. In other words, different values of Kx may be created based on the same values stored in the SIM for a given the mobile device, but based on different values of Lx, subscriber IDs, or other of values associated with individual subscribers.

The above system provides a very high degree of protection by requiring a very significant amount of work to attack even a single subscriber, thus preventing a wide-spread attack using the scripting environment noted above. Under the above system, there is no single key to break. An attack on one device does not shorten or reduce the effort to attack another device.

The network or service provider owning the SIM may link files to a specific server. The mobile device will only take instructions from the server linked to the mobile operator owning the SIM while the SIM is installed. Thus, one server can not change files or codes for another server. Files from a server are allowed only to execute while the specific SIM linked to that server is inserted in the particular mobile device. This helps to ensure that only one service provider can create files or code for a particular mobile device. Thus, mobile devices will only run code created in conjunction with the SIM card inserted in the device at the time of code execution, preventing other mobile operators from altering codes for that operator (and visa versa).

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments. For example, while the system is generally described below as encrypting or authenticating files sent from the network server to the mobile device, the process may be reversed so that the processes performed by the network server are performed instead by the mobile device, and vice versa. Further, keys can be periodically changed. For example, the server may periodically send a new value Lx to the mobile device, which in turn generates a new hash value Kx.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the security system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A security system for securely providing data between a server computer and multiple mobile telecommunications devices, the system comprising:
    at least one server computer having at least one database,
        wherein the database stores software programs, scripts, or data, and
        wherein the server computer is configured to:
            generate a globally unique number,
            store the globally unique number in the database, and provide the globally unique number to a specific one of the multiple mobile telecommunications devices; and,
        wherein the server computer is further configured to:
            receive a hash value from the specific mobile telecommunications device,
            encrypt or digitally sign at least one file containing a software program, script, or data using the hash value, and
            provide to the specific mobile telecommunications device the encrypted or digitally signed file; and
    a Subscriber Identification Module (SIM), smart card, or tamper resistant memory module, at least releasable secured to the specific mobile telecommunications device, wherein the specific mobile telecommunications device wirelessly receives the globally unique number, and wherein the SIM, smart card, or tamper resistant memory module stores a locally resident secret or secure number, and generates the hash value based at least in part on the locally resident number and the wirelessly received globally unique number; and, wherein the specific mobile telecommunications device wirelessly provides the hash value to the at least one server computer, wirelessly receives the encrypted or digitally signed file, and locally decrypts or verifies the digital signature based at least in part on the generated hash value and without connectivity to the server or other external computer, and wherein the locally resident number on the specific mobile telecommunications device is an International Mobile Equipment Identifier (IMEI), a International Mobile Subscriber Identifier (IMSI), a Medium Access Control (MAC) address, a Universal Subscriber Identity Module (USIM), or an Electronic Serial Number (ESN).

2. The system of claim 1 wherein the file includes a software program or script, and wherein the specific mobile telecommunications device decrypts or verifies the digital signature based at least in part on the generated hash value at run-time each time the software program or script are executed.

3. The system of claim 1 wherein the server computer generates the unique number after receiving a short message from the specific mobile telecommunications device when provisioning a new wireless subscriber account.

4. A computer-readable storage medium whose contents cause at least one device, associated with a wireless telecommunications network, to perform a method to securely process data, or securely execute programs, the method comprising:

generating a globally unique number;
storing the globally unique number;
wirelessly providing the globally unique number to a specific receiving telecommunications device;
receiving a hash value from the specific receiving telecommunications device, wherein the hash value is generated at least in part on the globally unique number and a globally unique and locally resident number stored at the specific receiving telecommunications device,
wherein the locally resident number is locally stored in a secure memory location of a removable memory media releasably secured to the specific receiving telecommunications device, and wherein the removable memory media comprises a Subscriber Identification Module (SIM), a smart card, or a tamper resistant memory module;
encrypting or digitally signing at least one file using at least the hash value; and
providing to the specific receiving telecommunications device the encrypted or digitally signed file for locally decrypting or authenticating the file using at least the hash value and without connectivity to an external computer coupled to the wireless telecommunications network,
wherein the computer-readable storage medium is not a signal, wherein the SIM, smart card, or tamper resistant memory module stores the locally resident number, and generates the hash value based at least in part on the locally resident number and the globally unique number, and, wherein the locally resident number is an International Mobile Equipment Identifier (IMEI), a International Mobile Subscriber Identifier (IMSI), a Medium Access Control (MAC) address, a Universal Subscriber Identity Module (USIM), or an Electronic Serial Number (ESN).

5. The computer-readable storage medium of claim 4 wherein the computer-readable medium is a memory of the telecommunications mobile device.

6. The computer-readable storage medium of claim 4 wherein the computer-readable medium is a logical node in a computer network receiving the contents.

7. The computer-readable storage medium of claim 4 wherein the computer-readable medium is a computer-readable disk.

8. The computer-readable storage medium of claim 4 wherein the computer-readable medium is a memory of the telecommunications server.

9. A mobile telecommunications apparatus for use with a telecommunications server coupled to a wireless telecommunications network, wherein the mobile telecommunications apparatus is associated with at least one subscriber who subscribes to wireless telecommunication services from a telecommunications service provider, the apparatus comprising:

means for generating a globally unique number;
means for storing the globally unique number;
means for wirelessly providing the globally unique number to a specific receiving telecommunications component;
means for receiving a hash value from the specific receiving telecommunications device, wherein the hash value is generated at least in part on the globally unique number and a globally unique and locally resident number stored at the specific receiving telecommunications component,
wherein the locally resident number is locally stored in a secure memory location of a removable memory media releasably secured to the specific receiving telecommunications component, and
wherein the removable memory media comprises a Subscriber Identification Module (SIM), a smart card, or a tamper resistant memory module;
means for encrypting or digitally signing at least one file using at least the hash value; and
means for providing to the specific receiving telecommunications component the encrypted or digitally signed file for locally decrypting or authenticating the file using at least the hash value and without connectivity to an external computer coupled to the wireless telecommunications network,
wherein the SIM, smart card, or tamper resistant memory module stores the locally resident number, and generates the hash value based at least in part on the locally resident number and the globally unique number, and
wherein the locally resident number is an International Mobile Equipment Identifier (IMEI), a International Mobile Subscriber Identifier (IMSI), a Medium Access Control (MAC) address, a Universal Subscriber Identity Module (USIM), or an Electronic Serial Number (ESN).

* * * * *